US006754601B1

(12) United States Patent
Eryurek et al.

(10) Patent No.: US 6,754,601 B1
(45) Date of Patent: *Jun. 22, 2004

(54) DIAGNOSTICS FOR RESISTIVE ELEMENTS OF PROCESS DEVICES

(75) Inventors: Evren Eryurek, Minneapolis, MN (US); Steven R. Esboldt, Eagan, MN (US); Gregory H. Rome, Fridley, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/409,098

(22) Filed: Sep. 30, 1999

Related U.S. Application Data

(63) Continuation-in-part of application No. 09/175,832, filed on Oct. 19, 1998, now Pat. No. 6,519,546, and a continuation-in-part of application No. 08/744,980, filed on Nov. 7, 1996, now Pat. No. 5,828,567.

(51) Int. Cl.[7] .............................................. G01C 19/00
(52) U.S. Cl. ..................... 702/104; 73/1.15; 73/1.57; 324/649
(58) Field of Search ................. 702/104, 130; 73/1.15, 1.57; 324/537–551, 649

(56) References Cited

U.S. PATENT DOCUMENTS

| | | | |
|---|---|---|---|
| 3,096,434 A | 7/1963 | King | 235/151 |
| 3,404,264 A | 10/1968 | Kugler | 235/194 |
| 3,468,164 A | 9/1969 | Sutherland | 73/343 |
| 3,590,370 A | 6/1971 | Fleischer | 324/51 |
| 3,618,592 A | 11/1971 | Stewart et al. | 128/2.05 |
| 3,688,190 A | 8/1972 | Blum | 324/61 R |
| 3,691,842 A | 9/1972 | Akeley | 73/398 C |
| 3,701,280 A | 10/1972 | Stroman | 73/194 |

(List continued on next page.)

FOREIGN PATENT DOCUMENTS

| | | |
|---|---|---|
| CA | 999950 | 11/1976 |
| DE | 32 13 866 A1 | 10/1983 |
| DE | 35 40 204 C1 | 9/1986 |
| DE | 40 08 560 A1 | 9/1990 |
| DE | 43 43 747 | 6/1994 |
| DE | 44 33 593 A1 | 6/1995 |
| DE | 195 02 499 A1 | 8/1996 |
| DE | 296 00 609 U1 | 3/1997 |
| DE | 197 04 694 A1 | 8/1997 |
| DE | 199 05 071 A1 | 2/1999 |

(List continued on next page.)

OTHER PUBLICATIONS

Patent Application of Evren Eryurek et al., Ser. No. 09/855,179, Filing Date May 14, 2001, entitled "Diagnostics for Industrial process Control and Measurement Systems".

(List continued on next page.)

*Primary Examiner*—John Barlow
*Assistant Examiner*—Hien Vo
(74) *Attorney, Agent, or Firm*—Westman, Champlin & Kelly (57) ABSTRACT

Diagnostic circuitry of a process device is used to detect degradation of a resistive element of the process device while the process device remains online, without the use of an additional power source. In addition, once degradation of the resistive element is detected, the diagnostic circuitry can be compensated for automatically. The diagnostic circuitry includes a testing circuit and a processing system. The testing circuit is coupled to the resistive element and is configured to apply a test signal to the resistive element. The test signal heats the resistive element and causes the resistive element to generate a response signal. The processing system compares a change in the response signal to a corresponding reference to detect degradation of the resistive element.

30 Claims, 5 Drawing Sheets

U.S. PATENT DOCUMENTS

| | | | |
|---|---|---|---|
| 3,849,637 A | 11/1974 | Caruso et al. | 235/151 |
| 3,855,858 A | 12/1974 | Cushing | 73/194 |
| 3,952,759 A | 4/1976 | Ottenstein | 137/12 |
| 3,973,184 A | 8/1976 | Raber | 324/51 |
| RE29,383 E | 9/1977 | Gallatin et al. | 137/14 |
| 4,058,975 A | 11/1977 | Gilbert et al. | 60/39.28 |
| 4,099,413 A | 7/1978 | Ohte et al. | 73/359 |
| 4,102,199 A | 7/1978 | Talpouras | 73/362 |
| 4,122,719 A | 10/1978 | Carlson et al. | 73/342 |
| 4,249,164 A | 2/1981 | Tivy | 340/870.3 |
| 4,250,490 A | 2/1981 | Dahlke | 340/870.37 |
| 4,279,013 A | 7/1981 | Cameron et al. | 364/105 |
| 4,337,516 A | 6/1982 | Murphy et al. | 364/551 |
| 4,399,824 A * | 8/1983 | Davidson | 374/163 |
| 4,417,312 A | 11/1983 | Cronin et al. | 364/510 |
| 4,517,468 A | 5/1985 | Kemper et al. | 290/52 |
| 4,530,234 A | 7/1985 | Cullick et al. | 73/53 |
| 4,540,468 A | 9/1985 | Genco et al. | 162/49 |
| 4,571,689 A | 2/1986 | Hildebrand et al. | 364/481 |
| 4,630,265 A | 12/1986 | Sexton | 370/85 |
| 4,635,214 A | 1/1987 | Kasai et al. | 364/551 |
| 4,642,782 A | 2/1987 | Kemper et al. | 706/25 |
| 4,644,479 A | 2/1987 | Kemper et al. | 364/550 |
| 4,649,515 A | 3/1987 | Thompson et al. | 364/900 |
| 4,668,473 A | 5/1987 | Agarwal | 422/62 |
| 4,686,638 A | 8/1987 | Furuse | 364/558 |
| 4,707,796 A * | 11/1987 | Calabro et al. | 702/34 |
| 4,720,806 A | 1/1988 | Schippers et al. | 364/551 |
| 4,736,367 A | 4/1988 | Wroblewski et al. | 370/85 |
| 4,736,763 A | 4/1988 | Britton et al. | 137/10 |
| 4,758,308 A | 7/1988 | Carr | 162/263 |
| 4,777,585 A | 10/1988 | Kokawa et al. | 364/164 |
| 4,791,352 A | 12/1988 | Frick et al. | 324/60 |
| 4,818,994 A | 4/1989 | Orth et al. | 340/870.21 |
| 4,831,564 A | 5/1989 | Suga | 364/551.01 |
| 4,841,286 A | 6/1989 | Kummer | 340/653 |
| 4,853,693 A | 8/1989 | Eaton-Williams | 340/588 |
| 4,873,655 A | 10/1989 | Kondraske | 364/553 |
| 4,907,167 A | 3/1990 | Skeirik | 364/500 |
| 4,924,418 A | 5/1990 | Bachman et al. | 364/550 |
| 4,934,196 A | 6/1990 | Romano | 73/861.38 |
| 4,939,753 A | 7/1990 | Olson | 375/107 |
| 4,964,125 A | 10/1990 | Kim | 371/15.1 |
| 4,988,990 A | 1/1991 | Warrior | 340/25.5 |
| 4,992,965 A | 2/1991 | Holter et al. | 364/551.01 |
| 5,005,142 A | 4/1991 | Lipchak et al. | 364/550 |
| 5,043,862 A | 8/1991 | Takahashi et al. | 364/162 |
| 5,053,815 A | 10/1991 | Wendell | 355/208 |
| 5,067,099 A | 11/1991 | McCown et al. | 364/550 |
| 5,081,598 A | 1/1992 | Bellows et al. | 364/550 |
| 5,083,091 A | 1/1992 | Frick et al. | 324/678 |
| 5,089,979 A | 2/1992 | McEachern et al. | 364/571.04 |
| 5,089,984 A | 2/1992 | Struger et al. | 395/650 |
| 5,098,197 A | 3/1992 | Shepard et al. | 374/120 |
| 5,099,436 A | 3/1992 | McCown et al. | 364/550 |
| 5,103,409 A | 4/1992 | Shimizu et al. | 364/556 |
| 5,111,531 A | 5/1992 | Grayson et al. | 395/23 |
| 5,121,467 A | 6/1992 | Skeirik | 395/11 |
| 5,122,794 A | 6/1992 | Warrior | 340/825.2 |
| 5,122,976 A | 6/1992 | Bellows et al. | 364/550 |
| 5,130,936 A | 7/1992 | Sheppard et al. | 364/551.01 |
| 5,134,574 A | 7/1992 | Beaverstock et al. | 364/551.01 |
| 5,137,370 A | 8/1992 | McCulloch et al. | 374/173 |
| 5,142,612 A | 8/1992 | Skeirik | 395/11 |
| 5,143,452 A | 9/1992 | Maxedon et al. | 374/170 |
| 5,148,378 A | 9/1992 | Shibayama et al. | 364/551.07 |
| 5,150,289 A | 9/1992 | Badavas | 364/154 |
| 5,167,009 A | 11/1992 | Skeirik | 395/27 |
| 5,175,678 A | 12/1992 | Frerichs et al. | 364/148 |
| 5,193,143 A | 3/1993 | Kaemmerer et al. | 395/51 |
| 5,197,114 A | 3/1993 | Skeirik | 395/22 |
| 5,197,328 A | 3/1993 | Fitzgerald | 73/168 |
| 5,212,765 A | 5/1993 | Skeirik | 395/22 |
| 5,214,582 A | 5/1993 | Gray | 364/424.03 |
| 5,216,226 A | 6/1993 | Miyoshi | 219/497 |
| 5,224,203 A | 6/1993 | Skeirik | 395/11 |
| 5,228,780 A | 7/1993 | Shepard et al. | 374/175 |
| 5,235,527 A | 8/1993 | Ogawa et al. | 364/571.05 |
| 5,265,031 A | 11/1993 | Malczewski | 364/497 |
| 5,265,222 A | 11/1993 | Nishiya et al. | 395/3 |
| 5,269,311 A | 12/1993 | Kirchner et al. | 128/672 |
| 5,274,572 A | 12/1993 | O'Neill et al. | 364/550 |
| 5,282,131 A | 1/1994 | Rudd et al. | 364/164 |
| 5,282,261 A | 1/1994 | Skeirik | 395/22 |
| 5,293,585 A | 3/1994 | Morita | 395/52 |
| 5,303,181 A | 4/1994 | Stockton | 365/96 |
| 5,305,230 A | 4/1994 | Matsumoto et al. | 364/495 |
| 5,311,421 A | 5/1994 | Nomura et al. | 364/157 |
| 5,317,520 A | 5/1994 | Castle | 364/482 |
| 5,327,357 A | 7/1994 | Feinstein et al. | 364/502 |
| 5,333,240 A | 7/1994 | Matsumoto et al. | 395/23 |
| 5,347,843 A | 9/1994 | Orr et al. | 73/3 |
| 5,349,541 A | 9/1994 | Alexandro, Jr. et al. | 364/578 |
| 5,357,449 A | 10/1994 | Oh | 364/551.01 |
| 5,361,628 A | 11/1994 | Marko et al. | 73/116 |
| 5,365,423 A | 11/1994 | Chand | 364/140 |
| 5,365,787 A | 11/1994 | Hernandez et al. | 73/660 |
| 5,367,612 A | 11/1994 | Bozich et al. | 395/22 |
| 5,384,699 A | 1/1995 | Levy et al. | 364/413.13 |
| 5,386,373 A | 1/1995 | Keeler et al. | 364/577 |
| 5,388,465 A | 2/1995 | Okaniwa et al. | 73/861.17 |
| 5,394,341 A | 2/1995 | Kepner | 364/551.01 |
| 5,394,543 A | 2/1995 | Hill et al. | 395/575 |
| 5,404,064 A | 4/1995 | Mermelstein et al. | 310/319 |
| 5,408,406 A | 4/1995 | Mathur et al. | 364/163 |
| 5,408,586 A | 4/1995 | Skeirik | 395/23 |
| 5,414,645 A | 5/1995 | Hirano | 364/551.01 |
| 5,419,197 A | 5/1995 | Ogi et al. | 73/659 |
| 5,430,642 A | 7/1995 | Nakajima et al. | 364/148 |
| 5,434,774 A | 7/1995 | Seberger | 364/172 |
| 5,436,705 A | 7/1995 | Raj | 355/246 |
| 5,440,478 A | 8/1995 | Fisher et al. | 364/188 |
| 5,442,639 A | 8/1995 | Crowder et al. | 371/20.1 |
| 5,467,355 A | 11/1995 | Umeda et al. | 364/571.04 |
| 5,469,070 A | 11/1995 | Koluvek | 324/713 |
| 5,469,156 A | 11/1995 | Kogura | 340/870.38 |
| 5,469,735 A | 11/1995 | Watanabe | 73/118.1 |
| 5,469,749 A | 11/1995 | Shimada et al. | 73/861.47 |
| 5,481,199 A | 1/1996 | Anderson et al. | 324/705 |
| 5,481,200 A | 1/1996 | Voegele et al. | 324/718 |
| 5,483,387 A | 1/1996 | Bauhahn et al. | 359/885 |
| 5,485,753 A | 1/1996 | Burns et al. | 73/720 |
| 5,486,996 A | 1/1996 | Samad et al. | 364/152 |
| 5,488,697 A | 1/1996 | Kaemmerer et al. | 395/51 |
| 5,489,831 A | 2/1996 | Harris | 318/701 |
| 5,495,769 A | 3/1996 | Borden et al. | 73/718 |
| 5,510,779 A | 4/1996 | Maltby et al. | 340/870.3 |
| 5,511,004 A | 4/1996 | Dubost et al. | 364/554.01 |
| 5,526,293 A | 6/1996 | Mozumder et al. | 364/578 |
| 5,539,638 A | 7/1996 | Keeler et al. | 364/424.03 |
| 5,548,528 A | 8/1996 | Keeler et al. | 364/497 |
| 5,560,246 A | 10/1996 | Bottinger et al. | 73/861.15 |
| 5,561,599 A | 10/1996 | Lu | 364/164 |
| 5,570,300 A | 10/1996 | Henry et al. | 364/551.01 |
| 5,572,420 A | 11/1996 | Lu | 364/153 |
| 5,573,032 A | 11/1996 | Lenz et al. | 137/486 |
| 5,591,922 A | 1/1997 | Segeral et al. | 73/861.04 |
| 5,598,521 A | 1/1997 | Kilgore et al. | 395/326 |
| 5,600,148 A | 2/1997 | Cole et al. | 250/495.1 |
| 5,608,650 A | 3/1997 | McClendon et al. | 364/510 |
| 5,623,605 A | 4/1997 | Keshav et al. | 395/200.17 |

| | | | |
|---|---|---|---|
| 5,629,870 A | 5/1997 | Farag et al. ............ 364/551.01 |
| 5,633,809 A | 5/1997 | Wissenbach et al. ....... 364/510 |
| 5,637,802 A | 6/1997 | Frick et al. .................... 73/724 |
| 5,640,491 A | 6/1997 | Bhat et al. ..................... 395/22 |
| 5,654,869 A | 8/1997 | Ohi et al. .................... 361/540 |
| 5,661,668 A | 8/1997 | Yemini et al. .............. 364/550 |
| 5,665,899 A | 9/1997 | Willcox ....................... 73/1.63 |
| 5,669,713 A * | 9/1997 | Schwartz et al. .............. 374/1 |
| 5,671,335 A | 9/1997 | Davis et al. ................... 395/23 |
| 5,672,247 A | 9/1997 | Pangalos et al. .............. 162/65 |
| 5,675,504 A | 10/1997 | Serodes et al. ............. 364/496 |
| 5,675,724 A | 10/1997 | Beal et al. ............. 395/182.02 |
| 5,680,109 A | 10/1997 | Lowe et al. ................. 340/608 |
| 5,682,317 A | 10/1997 | Keeler et al. .......... 364/431.03 |
| 5,700,090 A | 12/1997 | Eryurek ....................... 374/210 |
| 5,703,575 A | 12/1997 | Kirkpatrick ............ 340/870.17 |
| 5,704,011 A | 12/1997 | Hansen et al. ................. 395/22 |
| 5,705,978 A | 1/1998 | Frick et al. ................. 340/511 |
| 5,708,211 A | 1/1998 | Jepson et al. ............. 73/861.04 |
| 5,708,585 A | 1/1998 | Kushion ...................... 364/431 |
| 5,710,370 A | 1/1998 | Shanahan et al. ............. 73/1.35 |
| 5,713,668 A | 2/1998 | Lunghofer et al. .......... 374/179 |
| 5,719,378 A | 2/1998 | Jackson, Jr. et al. ......... 219/497 |
| 5,736,649 A | 4/1998 | Kawasaki et al. ........ 73/861.23 |
| 5,741,074 A | 4/1998 | Wang et al. ................. 374/185 |
| 5,742,845 A | 4/1998 | Wagner ....................... 395/831 |
| 5,746,511 A | 5/1998 | Eryurek et al. ................. 374/2 |
| 5,747,701 A | 5/1998 | Marsh et al. ............. 73/861.23 |
| 5,752,008 A | 5/1998 | Bowling ..................... 395/500 |
| 5,764,891 A | 6/1998 | Warrior ................... 395/200.2 |
| 5,801,689 A | 9/1998 | Huntsman .................. 345/329 |
| 5,805,442 A | 9/1998 | Crater et al. ................ 364/138 |
| 5,817,950 A | 10/1998 | Wiklund et al. .......... 73/861.66 |
| 5,828,567 A | 10/1998 | Eryurek et al. .............. 364/184 |
| 5,829,876 A | 11/1998 | Schwartz et al. .............. 374/1 |
| 5,848,383 A | 12/1998 | Yunus ........................ 702/104 |
| 5,859,964 A | 1/1999 | Wang et al. ............ 395/185.01 |
| 5,876,122 A | 3/1999 | Eryurek ....................... 374/183 |
| 5,880,376 A | 3/1999 | Sai et al. .................. 73/861.08 |
| 5,887,978 A | 3/1999 | Lunghofer et al. .......... 374/179 |
| 5,908,990 A | 6/1999 | Cummings ............... 73/861.22 |
| 5,923,557 A | 7/1999 | Eidson ................... 364/471.03 |
| 5,924,086 A | 7/1999 | Mathur et al. ................. 706/25 |
| 5,926,778 A | 7/1999 | Poppel ........................ 702/130 |
| 5,936,514 A | 8/1999 | Anderson et al. ...... 340/310.01 |
| 5,940,290 A | 8/1999 | Dixon ......................... 364/138 |
| 5,956,663 A | 9/1999 | Eryurek ....................... 702/183 |
| 5,970,430 A | 10/1999 | Burns et al. ................. 702/122 |
| 6,005,500 A | 12/1999 | Gaboury et al. .............. 341/43 |
| 6,014,902 A | 1/2000 | Lewis et al. .............. 73/861.12 |
| 6,016,523 A | 1/2000 | Zimmerman et al. ......... 710/63 |
| 6,016,706 A | 1/2000 | Yamamoto et al. ................ 9/6 |
| 6,017,143 A | 1/2000 | Eryurek et al. .............. 700/51 |
| 6,023,399 A | 2/2000 | Kogure ........................ 361/23 |
| 6,038,579 A | 3/2000 | Sekine ........................ 708/400 |
| 6,045,260 A | 4/2000 | Schwartz et al. ........... 374/183 |
| 6,047,220 A | 4/2000 | Eryurek ....................... 700/28 |
| 6,047,222 A | 4/2000 | Burns et al. .................. 700/79 |
| 6,052,655 A | 4/2000 | Kobayashi et al. .......... 702/184 |
| 6,072,150 A | 6/2000 | Sheffer .................. 219/121.83 |
| 6,112,131 A | 8/2000 | Ghorashi et al. ............ 700/142 |
| 6,119,047 A | 9/2000 | Eryurek et al. ............... 700/28 |
| 6,119,529 A | 9/2000 | Di Marco et al. ........ 73/861.68 |
| 6,139,180 A * | 10/2000 | Usher et al. .................... 374/1 |
| 6,182,501 B1 | 2/2001 | Furuse et al. ............... 73/49.2 |
| 6,192,281 B1 | 2/2001 | Brown et al. ................. 700/2 |
| 6,195,591 B1 | 2/2001 | Nixon et al. ................. 700/83 |
| 6,199,018 B1 | 3/2001 | Quist et al. .................. 702/34 |
| 6,236,948 B1 | 5/2001 | Eck et al. ..................... 702/45 |
| 6,263,487 B1 | 7/2001 | Stripf et al. .................... 717/1 |
| 6,298,377 B1 | 10/2001 | Hartikainen et al. ......... 709/223 |

| | | | |
|---|---|---|---|
| 6,311,136 B1 | 10/2001 | Henry et al. .................. 702/45 |
| 6,327,914 B1 | 12/2001 | Dutton .................. 73/861.356 |
| 6,347,252 B1 | 2/2002 | Behr et al. ...................... 700/3 |
| 6,360,277 B1 | 3/2002 | Ruckley et al. ............. 709/250 |
| 6,370,448 B1 | 4/2002 | Eryurek ..................... 700/282 |
| 6,377,859 B1 | 4/2002 | Brown et al. ................. 700/79 |
| 6,397,114 B1 | 5/2002 | Eryurek et al. ............... 700/51 |
| 6,425,038 B1 | 7/2002 | Sprecher ..................... 710/269 |
| 2003/0033040 A1 | 2/2003 | Billings ....................... 700/97 |
| 2003/0045962 A1 | 3/2003 | Eryurek et al. ............. 700/128 |

FOREIGN PATENT DOCUMENTS

| | | | |
|---|---|---|---|
| DE | 19930660 A1 | 7/1999 | |
| DE | 299 17 651 U1 | 12/2000 | |
| EP | 0 122 622 A1 | 10/1984 | |
| EP | 0 413 814 A1 | 2/1991 | |
| EP | 0 487 419 A2 | 5/1992 | |
| EP | 0 512 794 A2 | 5/1992 | |
| EP | 0 594 227 A1 | 4/1994 | |
| EP | 0 624 847 A1 | 11/1994 | |
| EP | 0 644 470 A2 | 3/1995 | |
| EP | 0 807 804 A2 | 5/1997 | |
| EP | 0 825 506 A2 | 7/1997 | |
| EP | 0 827 096 A2 | 9/1997 | |
| EP | 0 838 768 A2 | 9/1997 | |
| EP | 1058093 A1 | 5/1999 | |
| EP | 1022626 | 7/2000 | |
| FR | 2 302 514 | 9/1976 | |
| FR | 2 334 827 | 7/1977 | |
| GB | 928704 | 6/1963 | |
| GB | 1 534 280 | 11/1978 | |
| GB | 1 534 288 | * 11/1978 | ........... G01B/31/00 |
| GB | 2 310 346 A | 8/1997 | |
| GB | 2342453 | 4/2000 | |
| GB | 2347232 | 8/2000 | |
| JP | 58-129316 | 8/1983 | |
| JP | 59-116811 | 7/1984 | |
| JP | 59163520 | 9/1984 | |
| JP | 59-211196 | 11/1984 | |
| JP | 59-211896 | 11/1984 | |
| JP | 60-507 | 1/1985 | |
| JP | 60-76619 | 5/1985 | |
| JP | 60-131495 | 7/1985 | |
| JP | 60174915 | 9/1985 | |
| JP | 62-30915 | 2/1987 | |
| JP | 64-1914 | 1/1989 | |
| JP | 64001914 | 1/1989 | |
| JP | 64-72699 | 3/1989 | |
| JP | 2-5105 | 1/1990 | |
| JP | 03229124 | 11/1991 | |
| JP | 5-122768 | 5/1993 | |
| JP | 06242192 | 9/1994 | |
| JP | 7-63586 | 3/1995 | |
| JP | 07234988 | 9/1995 | |
| JP | 8-54923 | 2/1996 | |
| JP | 08102241 | 4/1996 | |
| JP | 8-136386 | 5/1996 | |
| JP | 8-166309 | 6/1996 | |
| JP | 08247076 | 9/1996 | |
| JP | 08-313466 | * 9/1996 | .......... G01N/27/04 |
| JP | 2712625 | 10/1997 | |
| JP | 2712701 | 10/1997 | |
| JP | 2753592 | 3/1998 | |
| JP | 07225530 | 5/1998 | |
| JP | 10 232170 | 9/1998 | |
| JP | 10-232170 | * 9/1998 | ............ G01K/7/02 |
| JP | 10 232171 | 9/1998 | |
| JP | 11083575 | 3/1999 | |
| WO | WO 94/25933 | 11/1994 | |
| WO | WO 96/11389 | 4/1996 | |
| WO | WO 96/12993 | 5/1996 | |

| | | |
|---|---|---|
| WO | WO 96/39617 | 12/1996 |
| WO | WO 97/21157 | 6/1997 |
| WO | WO 97/25603 | 7/1997 |
| WO | WO 98/06024 | 2/1998 |
| WO | WO 98/13677 | 4/1998 |
| WO | WO 98/20468 * | 5/1998 ........... G08C/19/02 |
| WO | WO 98/20469 | 5/1998 |
| WO | WO 98/39718 | 9/1998 |
| WO | WO 99/19782 | 4/1999 |
| WO | WO 00/55700 | 9/2000 |
| WO | WO 00/70531 | 11/2000 |

OTHER PUBLICATIONS

PCT Notification of Transmittal of International Search Report and International Search Report for International Application No. PCT/US 01/40791, filed May 22, 2001, mailed Mar. 11, 2002.

PCT Notification of Transmittal of International Search Report and International Search Report for International Application No. PCT/US 01/40782, filed May 22, 2001, mailed Mar. 18, 2002.

U.S. patent application Ser. No. 09/573,719, Coursolle et al., filed May 23, 2000.

U.S. patent application Ser. No. 09/799,824, Rome et al., filed Mar. 5, 2001.

"A TCP/IP Tutorial" by, Socolofsky et al., Spider Systems Limited, Jan. 1991 pp. 1–23.

"Approval Standards For Explosionproof Electrical Equipment General Requirements", Factory Mutual Research, C1. No. 3615, Mar. 1989, pp. 1–34.

"Approval Standard Intrinsically Safe Apparatus and Associated Apparatus For Use In Class I, II, and III, Division 1 Hazardous (Classified) Locations", Factory Mutual Research, C1. No. 3610, Oct. 1988, pp. 1–70.

"Automation On–line" by, Phillips et al., Plant Services, Jul. 1997, pp. 41–45.

"Climb to New Heights by Controlling your PLCs Over the Internet" by, Phillips et al., Intech, Aug. 1998, pp. 50–51.

"CompProcessor For Piezoresistive Sensors" MCA Technologies Inc. (MCA7707), pp. 1–8.

"Ethernet emerges as viable, inexpensive fieldbus", Paul G. Schreier, Personal Engineering, Dec. 1997, p. 23–29.

"Ethernet Rules Closed–loop System" by, Eidson et al., Intech, Jun. 1998, pp. 39–42.

"Fieldbus Standard for Use in Industrial Control Systems Part 2: Physical Layer Specification and Service Definition", ISA–S50.02–1992, pp. 1–93.

"Fieldbus Standard for Use in Industrial Control System Part 3: Data Link Service Definition", ISA–S50.02–1997, Part 3, Aug. 1997, pp. 1–159.

Fieldbus Standard For Use in Industrial Control Systems Part 4: Data Link Protocol Specification, ISA–S50.02–1997, Part 4, Aug. 1997, pp. 1–148.

"Fieldbus Support For Process Analysis" by, Blevins et al., Fisher–Rosemount Systems, Inc., 1995, pp. 121–128.

"Fieldbus Technical Overview Understanding Foundation™ fieldbus technology", Fisher–Rosemount, 1998, pp. 1–23.

"Hypertex Transfer Protocol—HTTP/1.0" by, Berners–Lee et al., MIT/LCS, May 1996, pp. 1–54.

"Infranets, Intranets, and the Internet" by, Pradip Madan, Echelon Corp, Sensors, Mar. 1997, pp. 46–50.

"Internet Technology Adoption into Automation" by, Fondl et al., Automation Business, pp. 1–5.

"Internet Protocol Darpa Internet Program Protocol Specification" by, Information Sciences Institute, University of Southern California, RFC 791, Sep. 1981, pp. 1–43.

"Introduction to Emit", emWare, Inc., 1997, pp. 1–22.

"Introduction to the Internet Protocols" by, Charles L. Hedrick, Computer Science Facilities Group, Rutgers University, Oct. 3, 1988, pp. 1–97.

"Is There A Future For Ethernet in Industrial Control?", Miclot et al., Plant Engineering, Oct. 1988, pp. 44–46, 48, 50.

LFM/SIMA Internet Remote Diagnostics Research Project Summary Report, Stanford University, Jan. 23, 1997, pp. 1–6.

"Managing Devices with the Web" by, Howard et al., Byte, Sep. 1997, pp. 45–64.

"Modular Microkernel Links GUI and Browser For Embedded Web Devices" by, Tom Williams, pp. 1–2.

"PC Software Gets Its Edge From Windows, Components, and the Internet", Wayne Labs, I&CS, Mar. 1997, pp. 23–32.

Proceedings Sensor Expo, Aneheim, California, Produced by Expocon Managemnet Associates, Inc., Apr. 1996, pp. 9–21.

Proceedings Sensor Expo, Boston, Massachuttes, Produced by Expocon Management Associates, Inc., May 1997, pp. 1–416.

"Smart Sensor Network of the Future" by, Jay Warrior, Sensors, Mar. 1997, pp. 40–45.

"The Embedded Web Site" by, John R. Hines, IEEE Spectrum, Sep. 1996, p. 23.

"Transmission Control Protocol: Darpa Internet Program Protocol Specification" Information Sciences Institute, Sep. 1981, pp. 1–78.

"Advanced Engine Diagnostics Using Universal Process Modeling", by P. O'Sullivan, *Presented at the 1996 SAE Conference on Future Transportation Technology*, pp. 1–9.

"Thermocouple Continuity Checker," IBM Technical Disclosure Bulletin, vol. 20, No. 5, pp. 1954 (Oct. 1977).

"A Self–Validating Thermocouple," Janice C–Y et al., IEEE Transactions on Control Systems Technology, vol. 5, No. 2, pp. 239–53 (Mar. 1997).

*Instrument Engineers' Handbook*, Chapter IV entitled "Temperature Measurements," by T.J. Claggett, pp. 266–333 (1982).

"emWare's Releases EMIT 3.0, Allowing Manufacturers to Internet and Network Enable Devices Royalty Free," 3 pages, PR Newswire (Nov. 4, 1998).

Warrior, J., "The IEEE P1451.1 Object Model Network Independent Interfaces for Sensors and Actuators," pp. 1–14, Rosemount Inc. (1997).

Warrior, J., "The Collision Between the Web and Plant Floor Automation," 6th WWW Conference Workshop on Embedded Web Technology, Santa Clara, CA (Apr. 7, 1997).

Microsoft Press Computer Dictionary, 3rd Edition, p. 124.

"Internal Statistical Quality Control for Quality Monitoring Instruments," by P. Girling et al., *ISA*, 15 pgs., 1999.

Web Pages from www.triant.com (3 pgs.).

"Statistical Process Control (Practice Guide Series Book)", *Instrument Society of America*, 1995, pp. 1–58 and 169–204.

"Time–Frequency Analysis of Transient Pressure Signals for a Mechanical Heart Valve Cavitation Study," *ASAIO Journal*, by Alex A. Yu et al., vol. 44, No. 5, pp. M475–M479, (Sep.—Oct. 1998).

"Transient Pressure Signals in Mechanical Heart Valve Caviation," by Z.J. Wu et al., pp. M555–M561 (undated).

"Caviation in Pumps, Pipes and Valves," *Process Engineering*, by Dr. Ronald Young, pp. 47 and 49 (Jan. 1990).

"Quantification of Heart Valve Cavitation Based on High Fidelity Pressure Measurements," *Advances in Bioengineering 1994*, by Laura A. Garrison et al., Bed–vol. 28, pp. 297–298 (Nov. 6–11, 1994).

"Monitoring and Diagnosis of Cavitation in Pumps and Valves Using the Wigner Distribution," *Hydroaccoustic Facilities, Instrumentation, and Experimental Techniques*, NCA–vol. 10, pp. 31–36 (1991).

"Developing Predictive Models for Cavitation Erosion," *Codes and Standards in A Global Environment*, PVP–vol. 259, pp. 189–192 (1993).

"Self–Diagnosing Intelligent Motors: A Key Enabler for Next Generation Manufacturing System," by Fred M. Discenzo et al., pp. Mar. 1–Mar. 4 (1999).

"A Microcomputer–Based Instrument for Applications in Platinum Resistance Thermomety," by H. Rosemary Taylor and Hector A. Navarro, Journal of Physics E. Scientific Instrument, vol. 16, No. 11, pp. 1100–1104 (1983).

"Experience in Using Estelle for the Specification and Verification of a Fieldbus Protocol: FIP," by Barretto et al., Computer Networking, pp. 295–304 (1990).

"Computer Simulation of H1 Field Bus Transmission," by Utsumi et al., Advances in Instrumentation and Control, vol. 46, Part 2, pp. 1815–1827 (1991).

"Progress in Fieldbus Developments for Measuring and Control Application," by A. Schwaier,. Sensor and Acuators, pp. 115–119 (1991).

"Ein Emulationssystem zur Leistungsanalyse von Feldbussystemen, Teil 1," by R. Hoyer, pp. 335–336 (1991).

"Simulatore Integrato: Controllo su bus di campo," by Barabino et al., Automazione e Strumentazione, pp. 85–91 (Oct. 1993).

"Ein Modulares, verteiltes Diagnose–Expertensystem für die Fehlerdiagnose in lokalen Netzen," by Jürgen M. Schröder, pp. 557–565 (1990).

"Fault Diagnosis of Fieldbus System," by Jürgen Quade, pp. 577–581 (Oct. 1992).

"Ziele und Anwendungen von Feldbussystemen," by T. Pfeifer et al., pp. 549–557 (Oct. 1987).

"Profibus–Infrastrukturmaβnahamen," by Tilo Pfeifer et al., pp. 416–419 (Aug. 1991).

"Simulation des Zeitverhaltens von Feldbussystemen," by O. Schnelle, pp. 440–442 (1991).

"Modélistatin et simulation d'un bus de terrain: FIP," by Song et al, pp. 5–9 (undated).

"Feldbusnetz für Automatisierungssysteme mit intelligenten Funktionseinheiten," by W. Kriesel et al., pp. 486–489 (1987).

"Bus de campo para la inteconexion del proceso con sistemas digitales de control," Tecnologìa, pp. 141–147 (1990).

"Dezentrale Installation mit Echtzeit–Feldbus," Netzwerke, Jg. Nr. 3 v. 14.3, 4 pages (1990).

"Process Measurement and Analysis," by Liptak et al., Instrument Engineers' Handbook, Third Edition, pp. 528–530, (1998).

"A microcomputer–based instrument for applicants in platinum resistance thermometry", J. Phys. & Scientific Instrument, vol. 16 (1983), pp. 1100–1104.

"Fehlerdiagnose an Feldbussystemen," by Jurgen Quande, Munchen, pp. 577–581.

"Improving Dynamic Performance of Temperature Sensors with Fuzzy Control Technique," by Wang Lei, Measurement an dcontrol, University of Essen, pp. 872–873.

Microsoft Press, Computer Dictionary, Second Edition, The Comprehensive Standard for Business, School, Library, and Home, p. 156.

"Development of a Long–Life, High–Reliability Remoltely Operated Johnson Noise Thermometer," by R.L .Shepard et al., *ISA*, 1991, pp. 77–84.

"Application of Johnson Noise Thermometry to Space Nuclear Reactors," by M.J. Roberts et al., *Presented at the $6^{th}$ Symposium on Space Nuclear Power Systems*, Jan. 9–12, 1989.

"Sensor and Device Diagnostics for Predictive and Proactive Maintenance," by B. Boynton, *A Paper Presented at the Electric Power Research Institute—Fossil Plant Maintenance Conference* in Baltimore, Maryland, Jul. 29–Aug. 1, 1996, pp. 50–1—50–6.

"Smart Field Devices provide New Process Data, Increase System Flexibility," by Mark Boland, *I& CS*, Nov. 1994, pp. 45–51.

"Wavelet Analysis of Vibration, Part I: Theory[1]," by D. E. Newland, *Journal of Vibration and Acoustics*, vol. 116, Oct. 1994, pp. 409–416.

"Wavelet Analysis of Vibration, Part 2: Wavelet Maps," by D.E. Newland, *Journal of Vibration and Acoustic*, vol. 116, Oct. 1994, pp. 417–425.

"Field–Based Architecture is Based on Open Systems, Improves Plant Performance," by P. Cleaveland, *I& CS*, Aug. 1996, pp. 73–74.

"Tuned–Circuit Dual–Mode Johnson Noise Thermometers," by R.L. Shepard et al., Apr. 1992.

"Tuned–Circuit Johnson Noise Thermometry," by Michael Roberts et al., $7^{th}$ *Symposium on Space Nuclear Power System*, Jan. 1990.

"Survey, Applications, and Prospects of Johnson Noise Thermometry," by T. Blalock et al., *Electrical Engineering Department*, 1981 pp. 2–11.

"Noise Thermometry for Industrial and Metrological Applications at KFA Julich," by H. Brixy et al., $7^{th}$ *International Symposium on Temperature*, 1992.

"Johnson Noise Power Thermometer and its Application in Process Temperature Measurement," by T.V. Blalock et al., *American Institute of Physics*, 1982, pp. 1249–1259.

"In Situ Calibration of Nuclear Plant Platinum Resistance Thermometers Using Johnson Noise Methods," *EPRI*, Jun. 1983.

"Johnson Noise Thermometer for High Radiation and High–Temperature Environments," by L. Oakes et al., *Fifth Symposium on Space Nuclear Power Systems*, Jan. 1988, pp. 2–23.

"Development of a Resistance Thermometer For Use Up to 1600° . ", by M.J. de Groot et al., *CAL LAB*, Jul./Aug. 1996, pp. 38–41.

"Application of Neural Computing Paradigms for Signal Validation," by B.R. Upadhyaya et al., *Department of Nuclear Engineering*, pp. 1–18.

"Application of Neural Networks for Sensor Validation and Plant Monitoring," by B. Upadhyaya et al., *Nuclear Technology*, vol. 97, No. 2, Feb. 1992 pp. 170–176.

"Automated Generation of Nonlinear System Characterization for Sensor Failure Detection," by B.R. Upadhyaya et al., *ISA*, 1989 pp. 269–274.

"A Decade of Progress in High Temperature Johnson Noise Thermometry," by T.V. Blalock et al., *American Institute of Physics*, 1982 pp. 1219–1233.

"Detection of Hot Spots in Thin Metal Films Using an Ultra Sensitive Dual Channel Noise Measurement System," by G.H. Massiha et al., *Energy and Information Technologies in the Southeast*, vol. 3 of 3, Apr. 1989, pp. 1310–1314.

"Detecting Blockage in Process Connections of Differential Pressure Transmitters", by E. Taya et al., *SICE*, 1995, pp. 1605–1608.

"Development and Application of Neural Network Algorithms For Process Diagnostics," by B.R. Upadhyaya et al., *Proceedings of the 29th Conference on Decision and Control*, 1990, pp. 3277–3282.

"A Fault–Tolerant Interface for Self–Validating Sensors", by M.P. Henry, *Colloquim*, pp. Mar. 1–Mar. 2 (Nov. 1990).

"Fuzzy Logic and Artificial Neural Networks for Nuclear Power Plant Applications," by R.C. Berkan et al., *Proceedings of the American Power Conference*.

"Fuzzy Logic and Neural Network Applications to Fault Diagnosis", by P. Frank et al., *International Journal of Approximate Reasoning*, (1997), pp. 68–88.

"Keynote Paper: Hardware Compilation–A New Technique for Rapid Prototyping of Digital Systems–Applied to Sensor Validation", by M.P. Henry, *Control Eng. Practice*, vol. 3, No. 7., pp. 907–924 (1995).

"The Implications of Digital Communications on Sensor Validation", by M. Henry et al., *Report No. QUEL 1912/92*, (1992).

"In–Situ Response Time Testing of Thermocouples", *ISA*, by H.M. Hashemian et al., Paper No. 89–0056, pp. 587–593, (1989).

"An Integrated Architecture For Signal Validation in Power Plants," by B.R. Upadhyaya et al., *Third IEEE International Symposium on Intelligent Control*, Aug. 24–26, 1988, pp. 1–6.

"Integration of Multiple Signal Validation Modules for Sensor Monitoring," by B. Upadhyaya et al., *Department of Nuclear Engineering*, Jul. 8, 1990, pp. 1–6.

"Intelligent Behaviour for Self–Validating Sensors", by M.P. Henry, *Advances In Measurement*, pp. 1–7, (May 1990).

"Measurement of the Temperature Fluctuation in a Resistor Generating 1/F Fluctuation," by S. Hashiguchi, *Japanese Journal of Applied Physics*, vol. 22, No. 5, Part 2, May 1983, pp. L284–L286.

"Check of Semiconductor Thermal Resistance Elements by the Method of Noise Thermometry", by A. B. Kisilevskii et al., *Measurement Techniques*, vol. 25, No. 3, Mar. 1982, New York, USA, pp. 244–246.

"Neural Networks for Sensor Validation and Plant Monitoring," by B. Upadhyaya, *International Fast Reactor Safety Meeting*, Aug. 12–16, 1990, pp. 2–10.

"Neural Networks for Sensor Validation and Plantwide Monitoring," by E. Eryurek, 1992.

"A New Method of Johnson Noise Thermometry", by C.J. Borkowski et al., *Rev. Sci. Instrum.*, vol. 45, No. 2, (Feb. 1974), pp. 151–162.

Parallel, Fault–Tolerant Control and Diagnostics System for Feedwater Regulation in PWRS, by E. Eryurek et al., *Proceedings of the American Power Conference*.

"Programmable Hardware Architectures for Sensor Validation", by M.P. Henry et al., *Control Eng. Practice*, vol. 4, No. 10., pp. 1339–1354, (1996).

"Sensor Validation for Power Plants Using Adaptive Backpropagation Neural Network," *IEEE Transactions on Nuclear Science*, vol. 37, No. 2, by E. Eryurek et al. Apr. 1990, pp. 1040–1047.

"Signal Processing, Data Handling and Communications: The Case for Measurement Validation", by M.P. Henry, *Department of Engineering Science, Oxford University*.

"Smart Temperature Measurement in the '90s", by T. Kerlin et al., *C& I*, (1990).

"Software–Based Fault–Tolerant Control Design for Improved Power Plant Operation," *IEEE/IFAC Joint Symposium on Computer–Aided Control System Design*, Mar. 7–9, 1994 pp. 585–590.

A Standard Interface for Self–Validating Sensors, by M.P. Henry et al., *Report No. QUEL 1884/91*, (1991).

"Taking Full Advantage of Smart Transmitter Technology Now," by G. Orrison, *Control Engineering*, vol. 42, No. 1, Jan. 1995.

"Using Artifical Neural Networks to Identify Nuclear Power Plant States," by Israel E. Alguindigue et al., pp. 1–4.

"On–Line Statistical Process Control for a Glass Tank Ingredient Scale," by R.A. Weisman, *IFAC real Time Programming*, 1985, pp. 29–38.

"The Performance of Control Charts for Monitoring Process Variation," by C. Lowry et al., *Commun. Statis.—Simula.*, 1995, pp. 409–437.

"A Knowledge–Based Approach for Detection and Diagnosis of Out–Of–Control Events in Manufacturing Processes," by P. Love et al., *IEEE*, 1989, pp. 736–741.

Patent Application of Evren Eryurek et al., Ser. No. 09/852, 102, Filing Date May 9, 2001, entitled "Flow Diagnostic System".

IEEE Transactions on Magnetics, vol. 34, No. 5, Sep. 1998, "Optimal Design of the Coils of an Electromagnetic Flow Meter," pp. 2563–2566.

IEEE Transactions on Magnetics, vol. 30, No. 2, Mar. 1994, "Magnetic Fluid Flow Meter for Gases," pp. 936–938.

IEEE Instrumentation and Measurment Technology Conference, May 18–21, 1998, "New approach to a main error estimation for primary transducer of electromagnetic flow meter," pp. 1093–1097.

School of Engineering and Applied Sciences, by J.E. Amadi–Echendu and E. H. Higham, "Additional Information from Flowmeters via Signal Analysis," pp. 187–193.

Journal of Intelligent Manufacturing (1997) 8, 271–276 article entitled "On–line tool condition monitoring system with wavelet fuzzy neural network".

U.S. patent application Ser. No. 09/169,873, Eryurek et al., filed Oct. 12, 1998.

U.S. patent application Ser. No. 09/175,832, Eryurek et al., filed Oct. 19, 1998.

U.S. patent application Ser. No. 09/257,896, Eryurek et al., Filed Feb. 25, 1999.

U.S. patent application Ser. No. 09/303,869, Eryurek et al., filed May 3, 1999.

U.S. patent application Ser. No. 09/335,212, Kirkpatrick et al., filed Jun. 17, 1999.

U.S. patent application Ser. No. 09/344,631, Eryurek et al., filed Jun. 25, 1999.

U.S. patent application Ser. No. 09/360,473, Eryurek et al. filed Jul. 23, 1999.

U.S. patent application Ser. No. 09/369,530, Eryurek et al., filed Aug. 6, 1999.

U.S. patent applications Ser. No. 09/383,828, Eryurek et al., filed Aug. 27, 1999.

U.S. patent application Ser. No. 09/384,876, Eryurek et al., filed Aug. 27, 1999.

U.S. patent application Ser. No. 09/406,263, Kirkpatrick et al., filed Sep. 24, 1999.

U.S. patent application Ser. No. 09/409,098, Eryurek et al., filed Sep. 30, 1999.

U.S. patent application Ser. No. 09/409,114, Eryurek et al., filed Sep. 30, 1999.

U.S. patent application Ser. No. 09/565,604, Eruyrek et al., filed May 4, 2000.

U.S. patent application Ser. No. 09/576,450, Wehrs, filed May 23, 2000.

U.S. patent application Ser. No. 09/606,259, Eryurek, filed Jun. 29, 2000.

U.S. patent application Ser. No. 09/616,118, Eryurek et al., filed Jul. 14, 2000.

U.S. patent application Ser. No. 09/627,543, Eryurek et al., filed Jul. 28, 2000.

International Search Report for International Application No. PCT/US 02/14934 issued May 8, 2002, dated of mailing Aug. 28, 2002.

International Search Report for International Application No. PCT/US 02/14560 issued May 8, 2002, dated of mailing Sep. 3, 2002.

International Search Report dated Jul. 11, 2002 for International Application No. PCT/US 02/06606 filed Mar. 5, 2002.

* cited by examiner

DIAGNOSTICS FOR RESISTIVE ELEMENTS OF PROCESS DEVICES

This is a Continuation-In-Part of U.S. application Ser. No. 09/175,832, filed on Oct. 19, 1998, which issued as U.S. Pat. No. 6,519,546 on Feb. 11, 2003 and is a Continuation-in-Part of U.S. application Ser. No. 08/744,980, filed Nov. 7, 1996, which issued as U.S. Pat. No. 5,828,567 which issued on Oct. 27, 1998.

BACKGROUND OF THE INVENTION

Process devices are used in processing plants to monitor process variables and control industrial processes. Process devices are generally remotely located from a control room and are coupled to process control circuitry in the control room by a process control loop. The process control loop can be a 4–20 mA current loop that powers the process device and provides a communication link between the process device and the process control circuitry. Examples of process devices include process transmitters used to measure temperature, pressure, flow, pH, turbidity, level, or other process variables and various process control devices.

Resistive elements are typically found in process devices. Resistive elements can be process variable sensors, wires, coils, resistive temperature detectors (RTD's), thermocouples, electrical traces, terminations, and other components of process devices having an electrical resistance. Generally, the condition of these resistive elements tends to degrade over time due to wear caused by use and environmental conditions that results in a decrease in performance. Depending on the resistive element, the decrease in performance may produce inaccurate measurements or cause the process device to fail. As a result, process devices are periodically tested to establish the condition of these resistive elements to determine whether measurements must be compensated or whether the resistive element must be replaced.

For example, temperature transmitters can use RTD's to measure the temperature of process fluids. An RTD is a resistive element having a temperature-dependent resistance. The RTD is placed in thermal communication with the process fluid and the temperature transmitter injects a current into the RTD. The resultant voltage drop across the RTD is used to calculate the resistance of the RTD. The temperature of the process fluid is determined from the resistance of the RTD. As the condition of the RTD deteriorates, its relationship between resistance and temperature changes thus reducing the accuracy of its measurements. Consequently, temperature transmitters store calibration information which is used to compensate for the changing properties of the RTD. The calibration information used by the transmitter is determined by calibrating the transmitter.

Present calibration techniques are generally conducted offline. These techniques involve testing the process measurement device on-site or at the location of the process measurement device. One such offline calibration technique is the plunge test. Here, the RTD or temperature sensor is removed from the process and placed in a bath of a known temperature. The output from the sensor is monitored and compared to the actual temperature of the bath to determine the amount of compensation required or calibration factor. The calibration factor is then stored in the processing system of the process device. The calibration factor is used to compensate the output of the process device such that the output accurately represents the temperature of the process medium being measured. Other offline calibration techniques involve injecting the resistive element with a test current and analyzing the response signal produced by the resistive element in response to the test current. These techniques generally utilize an additional power source due to the power limitations of the process device.

The above-mentioned calibration techniques are inadequate because they can require that the device be tested on-site, that the device be disassembled, and that an additional power supply be provided. Furthermore, process devices which are calibrated offline are unable to automatically compensate for the changing properties of a resistive element used by the process device. Instead, these calibration techniques must be performed periodically on the process device to ensure that the calibration information stored in the process device will accurately compensate for the degradation of the resistive element used by the process device.

SUMMARY

Diagnostic circuitry of a process device is used to detect degradation of a resistive element of the process device while the process device remains online, without the use of an additional power source. In addition, once degradation of the resistive element is detected, the diagnostic circuitry can be compensated for automatically. The diagnostic circuitry includes a testing circuit and a processing system. The testing circuit is coupled to the resistive element and is configured to apply a test signal to the resistive element. The test signal heats the resistive element and causes the resistive element to generate a response signal. The processing system compares a change in the response signal to a corresponding reference to detect degradation of the resistive element.

DETAILED DESCRIPTION

Although the invention will be described with reference to specific embodiments of improved diagnostics for resistive elements of process devices, workers skilled in the art will recognize that changes can be made in form and detail without departing from the spirit and scope of the invention, which are defined by the appended claims.

Figure 1:
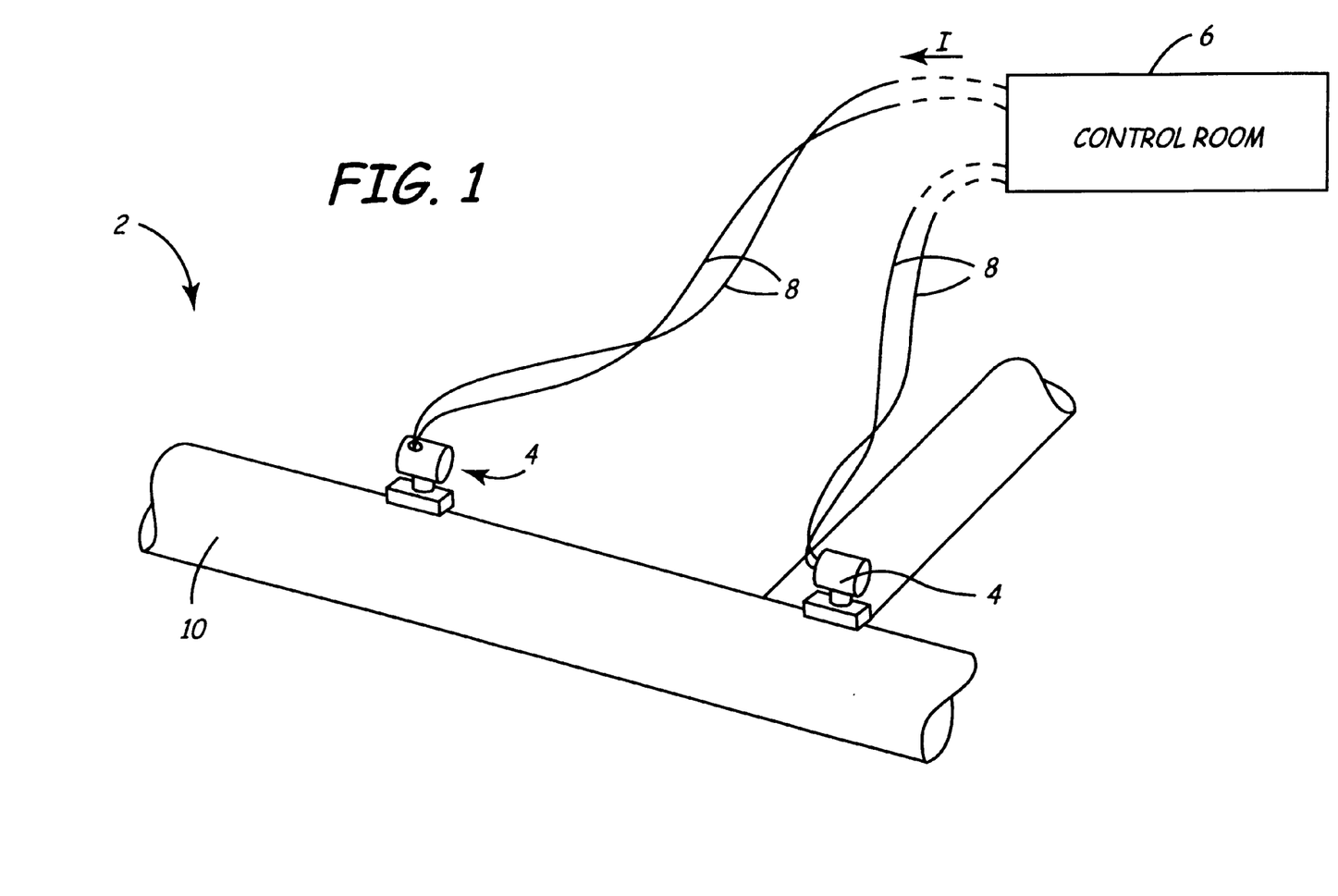
FIG. 1 is a diagram showing the environment of embodiments of the invention.

FIG. 1 is an environmental diagram showing a portion of a processing plant in which embodiments of the present invention operate. Process control system 2 includes illustrative process devices 4 coupled electrically to control room 6 over two wire process control loops 8. Process control loops 8 provide a communication link with control room 6 and power to control devices 4. Process devices 4 are mounted on a process container, such as piping 10, containing a process element (e.g. a process fluid) In the example shown, process device 4 is a process variable transmitter for measuring a process variable such as temperature, pressure, or other process variable, and transmitting process variable data relating to the process variable to control room 6 over control loop 8. As one alternative to the example shown, process device 4 is a process control device used to control the process element, such as a process control valve that is controlled by control signals from control room 6 transmitted over control loop 8.

Data pertaining to the process and control signals used to control the process are two forms of process device information. Process device information can be transmitted between control room 6 and process devices 4 over control loops 8 by adjusting the current flowing through control loops 8. For example, two-wire process devices 4 typically adjust the current flowing through loop 8 between a lower alarm level $I_L$ and an upper alarm level $I_U$, commonly 4 mA and 20 mA, respectively, to indicate a value of the process variable being monitored. Additionally, digital information can be transmitted over the control loops 8 in accordance with Highway Addressable Remote Transducer (HART®), FOUNDATION™ Fieldbus, Profibus, or Ethernet protocols as is common in the industry.

Figure 2:
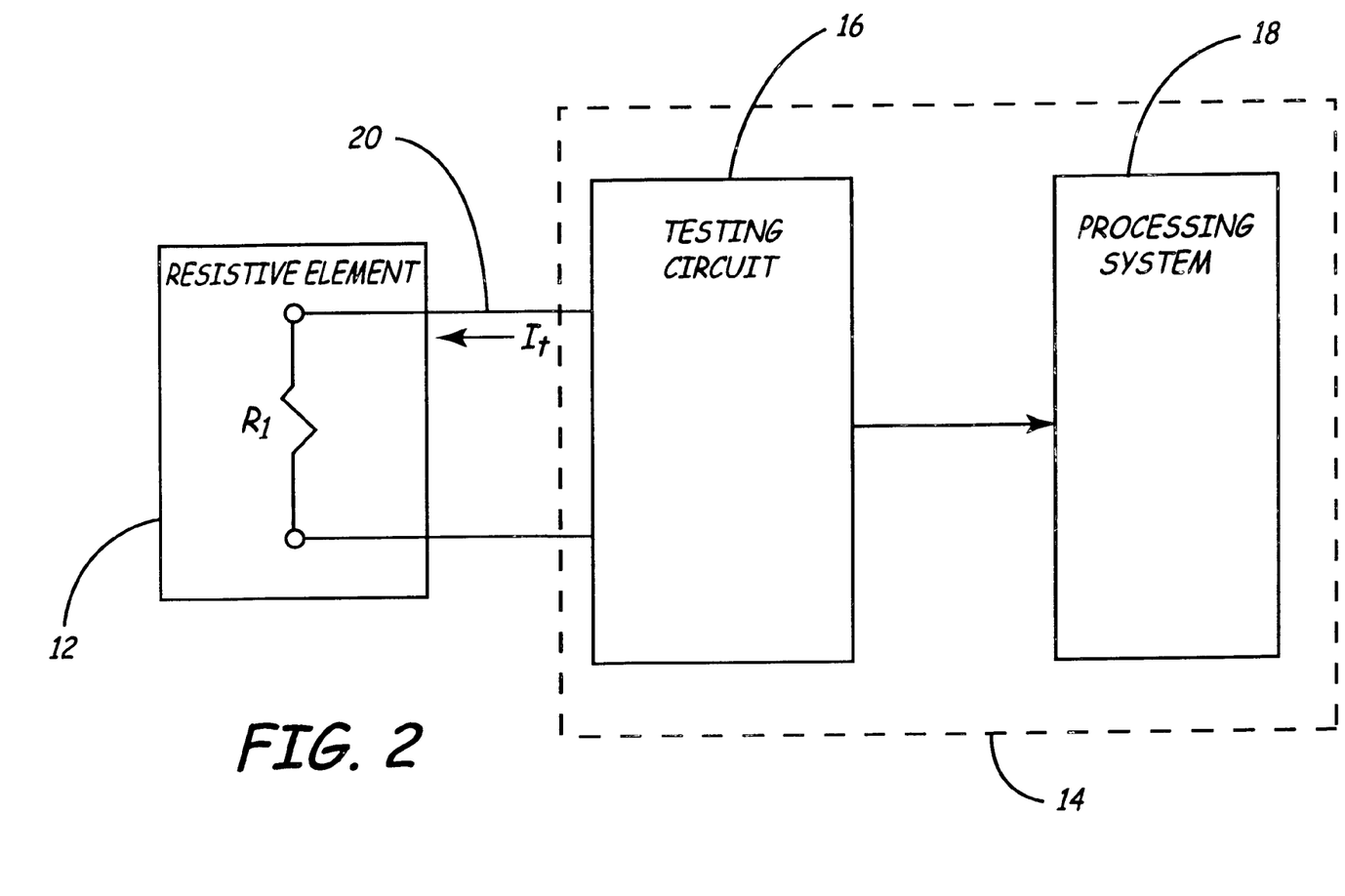
FIG. 2 is a simplified block diagram of an embodiment of the invention.
Figure 3:
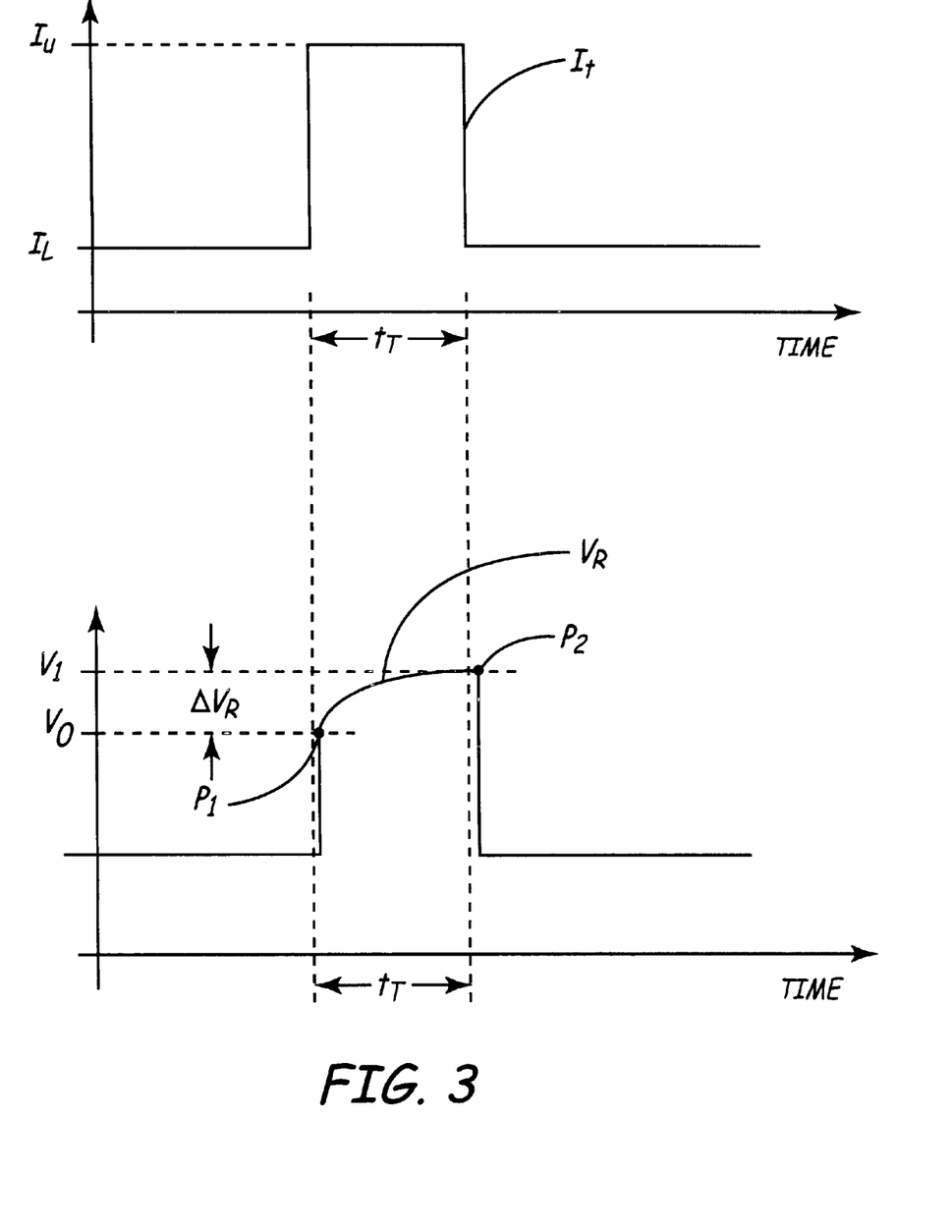
FIG. 3 is a graph of a test signal and a graph of a response signal.

Device 4 can either include or utilize a resistive element 12 having a resistance $R_1$, shown in FIGS. 2 and 3. Resistive element 12 can take on many forms depending on the function of process device 4. If process device 4 is a temperature transmitter, resistive element 12 could be a temperature sensor, such as an RTD (thin-film or wire-wound) sensor or a thermocouple. If process device 4 is a pressure transmitter resistive element 12 could be a strain gauge. Resistive element 12 can also take the form of a coil of a coriolis flowmeter such as is described in U.S. Pat. No. 5,231,884 issued Aug. 3, 1993. Other possibilities for resistive element 12 include wires, electrical traces, terminations, and other components of process devices 4 having an electrical resistance.

One aspect of the various embodiments includes a recognition that properties of resistive element 12 will change over time due to wear. Such change facilitates detection of degradation of resistive element 12 by comparing a characteristic of resistive element 12 to a reference characteristic representing a resistive element 12 in a good or healthy condition using diagnostic circuitry 14.

FIG. 2 shows a simple block diagram of an embodiment of diagnostic circuitry 14. Diagnostic circuitry 14 includes testing circuit 16 and processing system 18 and is generally configured to apply a test signal $I_T$ to resistive element 12 and to compare a characteristic of a response signal $V_R$ generated by resistive element 12 in response to test signal $I_T$, to a corresponding reference $V_{REF}$.

Testing circuit 16 acts as a test signal source and is coupleable to resistive element 12 through connection 20. Testing circuit 16 is configured to apply test signal $I_T$ to resistive element 12. Resistive element 12 is heated by test signal $I_T$ and generates response signal $V_R$, shown in FIG. 3, in response to test signal $I_T$. One embodiment of testing circuit 16, shown in FIG. 4, comprises a current source 22 and a voltage detector 24.

Processing system 18 can be configured to receive response signal VR from testing circuit 16, as indicated in FIG. 2. In one embodiment, processing system 18 can measure a change $\Delta V_R$ in response signal $V_R$ between two points P1 and P2 (FIG. 3) of response signal $V_R$ that are temporally spaced apart. Processing system 18 can further establish a difference D between change $\Delta V_R$ and corresponding reference change $\Delta V_{REF}$. Embodiments of processing system 18 include a microprocessor 26 and an analog-to-digital converter 28.

Connection 20 represents any connection or exchange of signals between the resistive element 12 and diagnostic circuitry 14. For example, if resistive element 12 is a process variable sensor and diagnostic circuitry 14 includes a microprocessor, connection 20 provides process variable data to the microprocessor. Similarly, if resistive element 12 is a process control element, the connection 20 provides a control signal from the microprocessor of diagnostic circuitry 14 to resistive element 12.

Test signal $I_T$ can be in the form of a current. In one embodiment of the invention, test signal $I_T$ raises the magnitude of the current to resistive element 12 from its nominal level ($\approx 200$ μA) to near upper alarm level $I_U$ ($\approx 20$ mA) for a test period $t_T$, as shown in FIG. 3. The duration of test period $t_T$ can be from a fraction of a second to more than 10 seconds depending upon the amplitude of test signal $I_T$.

The response signal $V_R$, generated by resistive element 12 in response to test signal $I_T$, is in the form of a voltage drop across resistance $R_1$, as shown in FIG. 3. The response signal $V_R$ quickly rises to an initial voltage $V_0$ and, as the temperature of resistive element 12 increases due to internal self-heating, the response signal $V_R$ increases to a peak or final voltage $V_f$. Processing system 18 is configured to measure change $\Delta V_R$ between two points P1 and P2 along response signal $V_R$ and to establish a difference D between the change $\Delta V_R$ and a corresponding reference $\Delta V_{REF}$. Reference $\Delta V_{REF}$ is representative of the resistive element in a good or healthy condition. As a result, the value of difference D is indicative of the condition of resistive element 12 and can be used to estimate the life-expectancy of resistive element 12.

The two points P1 and P2 of the response signal $V_R$ that are selected by processing system 18 are temporally spaced apart. The two points P1 and P2 must be suitably separated to ensure that the change $\Delta V_R$ is sufficiently large such that degradation of resistive element 12 can be detected when compared to the corresponding reference $\Delta V_{REF}$. The corresponding reference $\Delta V_{REF}$ is a reference change measured between two points of a reference response signal $V_{REF}$ (similar to response signal $V_R$ in FIG. 3) that is generated by the resistive element 12 in response to test signal $I_T$. The two points of the reference response signal $V_{REF}$ used to establish reference $\Delta V_{REF}$ correspond to the two points P1 and P2 of the response signal $V_R$ used to establish change $\Delta V_R$, so that a valid comparison can be made. Alternatively, the corresponding reference $\Delta V_{REF}$ could be a standardized value established through the testing of several resistive elements 12.

In one embodiment, the two points P1 and P2 selected by processing system 18 are positioned along the portion of the response signal $V_R$ which is changing due to the self-heating of resistive element 12. For example, processing system 18 can select initial voltage $V_0$ and final voltage $V_1$ as the points P1 and P2, respectively, which would relate to the boundaries of the portion of response signal $V_R$ that is changing due to the self-heating of resistive element 12. The change $\Delta V_R$ will be a change in voltage between points P1 and P2. Accordingly, corresponding reference $\Delta V_{REF}$ will be a change in voltage measured between two points that correspond to an initial and final voltage of the reference response signal $V_{REF}$. In another embodiment, the points P1 and P2 are selected along response signal $V_R$ at specific voltages by processing system 18. For example, processing system 18 can select point P1 when response signal $V_R$ reaches 0.7 volts and point P2 when response signal $V_R$ reaches 1.1 volts. In this embodiment, processing system measures the period of time it takes for response signal $V_R$ to rise from point P1 to point P2. As a result, change $\Delta V_R$ will be a period of time rather than a change in voltage. The corresponding reference $\Delta V_{REF}$ is also a period of time that is measured between the corresponding points of reference response signal $V_{REF}$ (i.e., 0.7 V and 1.1 V). In yet another embodiment, points P1 and P2 are selected at specific periods of time within test period $t_T$. For example, point P1 could be selected as the point along the response signal $V_R$ and the corresponding reference response signal at 0.1 seconds after the test signal $I_T$ is applied to resistive element 12 and point P2 could be selected as the point along the response signal $V_R$ and the corresponding reference response signal $V_{REF}$ at 0.1 seconds before the termination of test signal $I_T$.

Processing system 18 can establish difference D between change $\Delta V_R$ and corresponding reference change $\Delta V_{REF}$, which is indicative of the condition of resistive element 12. The larger the value of difference D, the greater the degradation resistive element 12 has undergone relative to the reference condition of resistive element 12. In one embodiment, processing system 18 can produce a diagnostic output that is indicative of the condition of resistive element 12, as a function of difference D.

Figure 4:
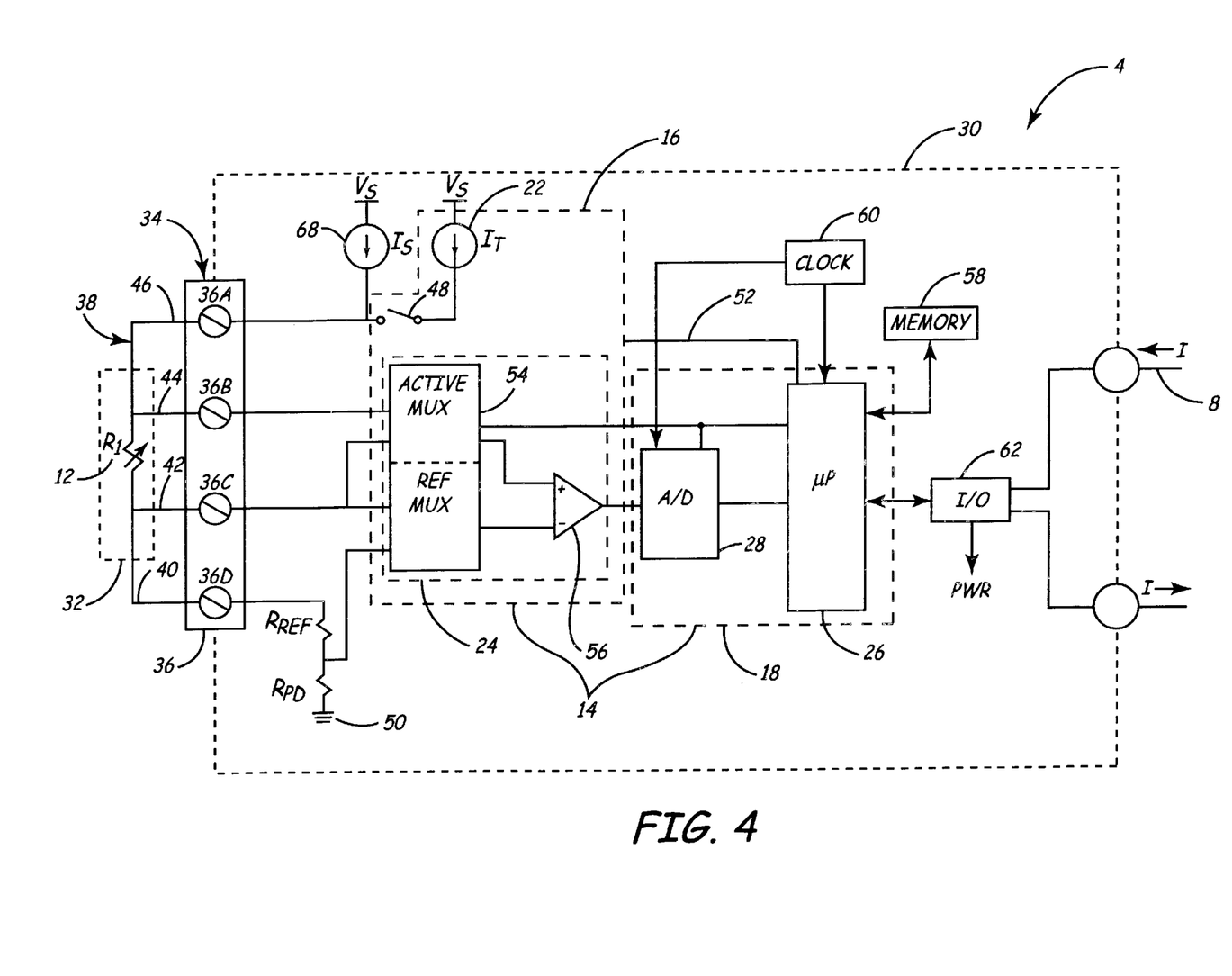
FIG. 4 is a simplified schematic in accordance with one embodiment of the invention.

FIG. 4 shows a simplified schematic of diagnostic circuitry 14 depicted as a component of process device circuitry 30 of a process device 4, such as a temperature transmitter, in accordance with one embodiment of the invention. Here, resistive element 12 of device 4 is depicted as an element of RTD sensor 32 and has a temperature-dependent resistance $R_1$. Sensor 32 can be either internal or external to device 4 and connects to process device circuitry 30 and diagnostic circuitry 14 at connector 34. Connector 34 includes a terminal block 36 having terminals 36A, 36B, 36C, and 36D for coupling to, for example, RTD temperature sensor 32. Sensor 32 connects to process device circuitry 30 at leads 38. Leads 38 are configured as a Kelvin connection and include four element leads 4.0, 42, 44, and 46. Lead 40 is connected between resistive element 12 and terminal 36D, lead 42 is connected between resistive element 12 and terminal 36C, lead 44 is connected between resistive element 12 and terminal 36B, and lead 46 is connected between resistive element 12 and terminal 36A.

One embodiment of testing circuit 16, shown in FIG. 4, includes current source 22, switch 48, and voltage detector 24. Current source 22 is configured to apply test signal $I_T$ through terminal 36A, resistive element 12, terminal 36D, reference resistance $R_{REF}$, pull-down resistance $R_{PD}$ and ground terminal 50. Resistive element 12 of sensor 32 generates response signal $V_R$ across terminals 36B and 36C which is a function of the resistance $R_1$.

Current source 22 of testing circuitry 16 can be controlled by processing system 18 through connection 52. Connection 52, shown in FIG. 4, is drawn to indicate that it could be used to control several aspects of testing circuit 16 including switch 48. In one embodiment, current source 22 is configured to produce test signal $I_T$ When processing system 18 closes switch 48, test signal $I_T$ is applied to resistive element 12 through connector 34. At the end of test period $t_T$, processing system 18 opens switch 48 to terminate the application of test signal $I_T$. In another embodiment, current source 22 (not shown) includes a Schmitt Trigger and a voltage-to-current (V-I) converter. The Schmitt trigger can be configured to produce a high voltage to an input of the V-I converter for test period $t_T$ then drop the input to a low or zero voltage at the input to the V-I converter. The V-I converter can be configured to produce test signal $I_T$, while receiving the high voltage from the Schmitt Trigger, that can be directed to resistive element 12 through switch 48. Processing system 18 controls switch 48 and can apply test signal $I_T$ to resistive element 12 as desired.

One embodiment of voltage detector 24 of testing circuit 16 is shown in FIG. 4 and includes multiplexer 54 and differential amplifier 56. Multiplexer 54 is divided into two sections, an active multiplexer having an output connected to the non-inverting input of differential amplifier 56 and a reference multiplexer having an output connected to the inverting input of differential amplifier 56. Multiplexer 54 can multiplex analog signals from terminals 36B, 36C, and the junction between reference resistor $R_{REF}$ and pull-down resistor $R_{PD}$, to the non-inverting and inverting inputs of differential amplifier 56.

FIG. 4 also shows one embodiment of processing system 18 that includes analog-to-digital (A/D) converter 28, microprocessor 26, and memory 58. Memory 58 stores instructions and information for microprocessor 26, including reference response information used for diagnostic purposes, such as reference $\Delta V_{REF}$. Microprocessor 26 operates at a speed determined by clock circuit 60. Clock circuit 60 includes a real time clock and a precision high speed clock, which are also used to sequence the operation of A/D converter 28. Microprocessor 26 can perform several functions, including control of testing circuit 16, control of communications over loop 8, temperature compensation, storage of transmitter configuration parameters, and diagnostics for resistive element 12. Microprocessor 26 controls multiplexer 54 of voltage detector 24 to multiplex appropriate sets of analog signals, including signals from terminals 36B, 36C, and 36D, to the non-inverting and inverting inputs of differential amplifier 56. Thus, microprocessor 26 can instruct voltage detector 24 to provide A/D converter 28 with the voltage drop across resistance $R_1$, or across terminals 36B and 36C. As a result, when test signal $I_T$ is applied to resistive element 12, microprocessor 26 can instruct voltage detector 24 to provide A/D converter 28 with the response signal $V_R$ generated by resistive element 12.

In one embodiment, A/D converter 28 has an accuracy of 17 bits and a conversion rate of 14 samples/second. A/D converter 28 converts the voltage from testing circuit 16 into a digital value and provides that value to microprocessor 26 for analysis.

Microprocessor 26 of processing system 18 can signal testing circuit 16 through connection 52 to apply test signal $I_T$ to resistive element 12, as mentioned above. When test signal $I_T$ is applied, resistive element 12 generates response signal $V_R$ that can be measured by microprocessor 26 through the control of multiplexer 54 and A/D converter 28. Microprocessor 26 can analyze response signal $V_R$ by selecting points P1 and P2 along response signal $V_R$ and calculating change $\Delta V_R$ as discussed above. Corresponding reference change $\Delta V_{REF}$ can be obtained from memory 58 and compared to change $\Delta V_R$ to establish difference D, which is indicative of the condition of resistive element 12.

Process device circuitry 30, which includes diagnostic circuitry 14, can be intrinsically safe to allow for safe operation of process device 4 in hazardous environments. In one embodiment, process device circuitry 30 is loop powered; i.e., wholly (completely) powered by loop 8, which could be a 4–20 mA loop. In another embodiment, process device circuitry 30 can be used in a 2-wire process device 4.

Process device circuitry 30 can communicate with a process control system over control loop 8 using device input-output (I/O) circuit 62, shown in FIG. 4. In one embodiment of the invention, device I/O circuit 62 communicates with the process control system by adjusting current I between 4 and 20 mA in accordance with a known communication protocol. Suitable communication protocols include HART®, FOUNDATION™ Fieldbus, Profibus, and Ethernet communication protocols. Additional protocols can also be used, for example, a four-wire configuration may be employed in which power is received from a separate source. If process device circuitry 30 is used in a process measurement transmitter, process device circuitry 30 can produce a process variable output, that is indicative of the value of the process variable being measured, using device I/O circuit 62. For example, if process device circuitry 30 is used in a temperature transmitter that utilizes RTD sensor 32 to measure the temperature of a process medium, then process device circuitry 30 can produce a process variable output, that is indicative of the temperature of the process medium, using device I/O circuit 62.

Diagnostic circuitry 14 can access device I/O circuit 62 of process device circuitry 30 with microprocessor 26, as shown in FIG. 4. Using device I/O circuit 62, the process control system can signal diagnostic circuitry 14 to perform a diagnostic test on resistive element 12 and, after conducting the test, diagnostic circuitry 14 can transmit a diagnostic output indicating the condition of resistive element 12 back to the process control system. The diagnostic output can take several forms.

In one embodiment, the diagnostic output represents the value of difference D. In another embodiment, the diagnostic output is a signal to the process control system that the difference D has exceeded a threshold value, stored in memory 58, indicating that resistive element 12 either needs to be re-calibrated or replaced.

Figure 5:
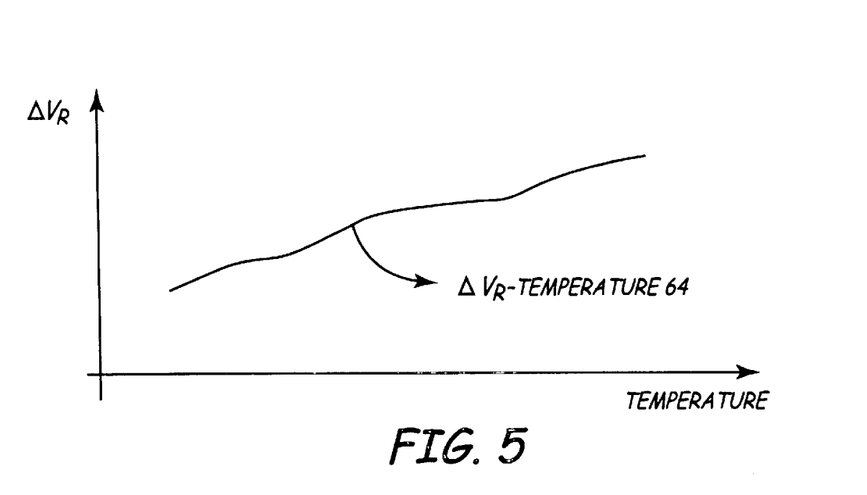
FIG. 5 shows a graph depicting the temperature dependence of a resistive element.
Figure 6:
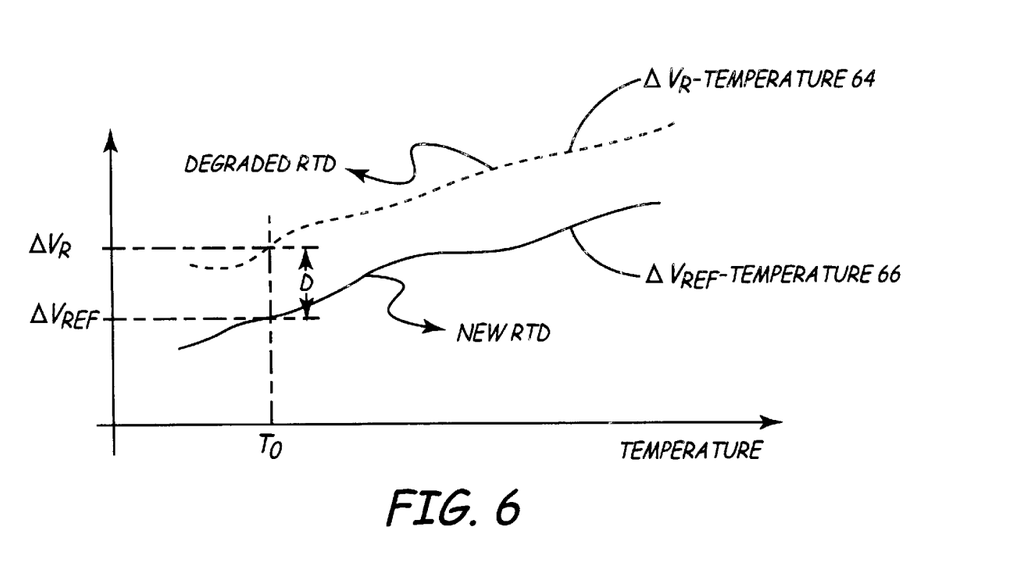
FIG. 6 shows a graph comparing a reference to a response signal over a range of operating temperatures.

Response signal $V_R$ generated by resistive element 12 can depend on the operating temperature $T_0$ of resistive element 12. Also, change $\Delta V_R$ measured by processing system 18 can also vary with temperature and can affect the determination of the condition of resistive element 12. This variance with temperature is shown in FIG. 5 as $\Delta V_R$-temperature curve 64. In one embodiment, a $\Delta V_{REF}$-Temperature-curve 66 is established by testing the resistive element 12, while in a new, good, or healthy condition, over a range of operating temperatures, as shown in FIG. 6. $\Delta V_{REF}$-Temperature curve 66 can be stored in memory 58 and accessed by processing system 18. Difference D can be established by processing system 18 by comparing the $\Delta V_R$, due to a test conducted at operating temperature $T_0$, to a corresponding reference $\Delta V_{REF}$ corresponding to operating temperature $T_0$, as shown in FIG. 6.

Process device circuitry 30 can measure operating temperature $T_0$ of resistive element 12 or the process medium in which resistive element 12 is place. The procedure used by process device circuitry 30 to measure operating temperature $T_0$ of resistive element 12 includes applying a nominal measurement current is through resistive element 12, measuring the voltage drop across the resistance $R_1$ of resistive element 12 $V_{R1}$, measuring the voltage drop $V_{RREF}$ across reference resistor $R_{REF}$, calculating the resistance value $R_1$, and obtaining the temperature corresponding to the resistance value $R_1$ from look-up tables in memory 58.

The measurement current $I_S$ is generated by current source 68. Current source 68 is connected to terminal block 36 and supplies test measurement current $I_s$ through terminal 36A, resistive element 12, terminal 36D, reference resistance $R_{REF}$, pull-down resistance $R_{PD}$ and ground terminal 50. Resistive element 12 of sensor 32 develops a voltage drop across terminals 36B and 36C which is a function of the resistance $R_1$, and, thus, the operating temperature $T_0$ of resistive element 12. Microprocessor 26 measures the voltage drop $V_{R1}$ across resistive element 12 of sensor 32 between terminals 36B and 36C, and the voltage drop $V_{RREF}$ across reference resistance $R_{REF}$ with multiplexer 54, due to measurement current $I_S$. In a four-wire resistance measurement such as the one shown in FIG. 4, the voltage drop across the connections to terminals 36B and 36C is largely eliminated, since substantially all of the current $I_S$ flows between terminals 36A and 36D, and has little impact on the accuracy of the measurement. Microprocessor 26 employs the following equation to compute the resistance $R_1$ of resistive element 12:

$$R_1 = \frac{V_{R1}}{V_{RREF}}(R_{REFNOM}) \qquad \text{Eq. 1}$$

where:
  $R_1$=resistance of RTD sensor element 204;
  $V_{R1}$=voltage drop across the RTD sensor element 204;
  $V_{RREF}$=voltage drop across resistance $R_{REF}$; and
  $R_{REFNOM}$=nominal resistance of the reference resistance $R_{REF}$ in Ohms, and/or stored in memory 212.

Microprocessor 26 converts the measured resistance $R_1$ into temperature units with a look-up table stored in memory 58. Alternatively microprocessor 26 can use an equation, stored in memory 58, such as the Callender-Van Dusen equation which is:

$$R(t) = R_0\left\{1 + \alpha\left(t - \delta\left(\frac{t}{100}\right)\left(\frac{t}{100} - 1\right) - \beta\left(\frac{t}{100} - 1\right)\left(\frac{t}{100}\right)^3\right)\right\} \qquad \text{Eq. 2}$$

Where:
  R(t)=Resistance at temperature t, in Ohms.
  $R_0$=Resistance at temperature O deg. C., Ohm.
  t=Temperature, deg C.
  α, δ, β=Calibration constants.
  β=0 for t>0 deg C.

Thus, microprocessor 26 can obtain the operating temperature $T_0$ of resistive element 12, which can be used to select the appropriate $\Delta V_{REF}$ value of the $\Delta V_{REF}$-temperature curve 66.

Although the self-heating of resistance $R_1$ will cause an increase in the operating temperature $T_0$, this increase is generally small and can be neglected. Thus, it is generally sufficient to use the operating temperature $T_0$ measured just prior to the application of test signal $I_T$ as the operating temperature of the resistive element during the test. However, if the operating temperature $T_0$ under which the resistive element 12 is operating is unstable, it may be necessary to validate the $\Delta V_R$ measurement by measuring the operating temperature $T_0$ of resistive element 12 after the application of test signal $I_T$ and comparing its value with the operating temperature $T_0$ of the resistive element 12 prior to the test. If the operating temperature $T_0$ after the test is approximately the same as before the test, then the $\Delta V_R$ measurement is presumed to be valid. If, however, the operating temperature after the test is not approximately the same as before the test, then the $\Delta V_R$ measurement is presumed to be invalid and the test will need to be repeated.

In one embodiment of the invention, process device circuitry 30 can be used in a process measurement transmitter, such as a temperature transmitter, and can produce a process variable output, that is indicative of the process variable being measured, using device I/O circuit 62. When resistive element 12 is an element of the sensor being used to measure the process variable, its degradation can affect the accuracy of the measurement and, thus, the accuracy of the process variable output. Once the degradation of resistive element 12 has been detected and quantified as a difference D, one embodiment of processing system 18 can automatically correct or adjust the process variable output as a function of the difference D. For example, as resistive element 12 of an RTD sensor 32 degrades, the temperature measured by RTD sensor 32 becomes inaccurate due to drift in alpha ($\alpha$) and/or $R_0$ (shown above in Equation 2). It has been discovered that there is a substantially linear relationship between the difference D and error in the temperature measurement caused by drift in alpha ($\alpha$) and/or $R_0$. The temperature can be corrected using the equation:

$$T_{corrected} = T_{measured} K(D) \qquad \text{Eq. 3}$$

where:

$T_{measured}$ is the measured temperature;

K is a constant of proportionality which is a function of the difference D; and $T_{corrected}$ is the autocorrected temperature.

The relationship between K and the difference D may be determined experimentally. Determination of K may be through an equation or, in one embodiment, with a lookup table stored in memory 58 as a function of difference D. Similarly, difference D can be correlated to alpha ($\alpha$) and $R_0$, or changes in these constants. Further, it is within the scope of the present invention to correlate difference D with other constraints in Equation 2.

One embodiment of diagnostic circuitry 14 can use empirical models or polynomial curve-fitting which are functions of the difference D. For example, a polynomial which is a function of the difference D can be used for computing the residual lifetime estimate or the life expectancy of resistive element 12. The constants and/or the equations may be sent over a two wire loop to process device circuitry 30. In another embodiment, processing system 18 of diagnostic circuitry 14 is implemented with a multi-layer neural network. Although a number of training algorithms can be used to develop a neural network model for different goals, one embodiment includes the known Backpropagation Network (BPN) to develop neural network modules which will capture the nonlinear relationship among a set of input and outputs(s).

Another embodiment of diagnostic circuitry 14 can use a set of if—then rules to reach a conclusion on the status of the resistive element 12, such as that used in an RTD sensor 32. The difference D is monitored and its present value is compared to upper and lower boundaries. The upper and lower boundaries are empirically set by testing of many RTD sensors 32. A decision is made based upon the comparison.

In another aspect of the invention, the rate of change (ROC) of the difference D is correlated with life expectancy of resistive element 12. The ROC of the difference D is provided to the diagnostic circuitry 14 and implemented in microprocessor 26. A diagnostic output can be provided that is indicative of the residual life of resistive element 12, including a warning when the residual life drops below a threshold value.

The various diagnostic functions set forth herein can be performed remotely, in a process control device, in the control room, in a computer located off-site or in a combination of these locations. Generally, the invention can be practiced in any of a number of places in a process system control system. In particular, the present invention as realized in software and a microprocessor, can reside in a central controller or even a final control element such as a valve, motor or switch. Furthermore, modern digital protocols such as Fieldbus, Profibus and others mentioned above, allow for the software which practices the present invention to be communicated between elements in a process control system, and also provide for process variables to be sensed in one transmitter and then sent to the software.

Embodiments diagnostic circuitry 14 can detect other types of degradation in a process device including corrosion of an electrical component. For example, in a wire, termination, coil, RTD, thermocouple, electrical trace on a printed circuit board or other electrical component which corrodes over time, there is a corresponding reduction in area which causes an increase in resistance. The present invention can detect such degradation prior to the ultimate failure of the device. Electrical components may degrade due to use which could also lead to eventual fatigue failure. The electrical element diagnostics of the present invention can detect such fatigue. Further, a loose termination such as occurs with a "cold" solder joint can be detected as the termination degrades.

What is claimed:

1. Diagnostic circuitry for detecting degradation of a resistive element of a process device, the diagnostic circuitry comprising:

a test signal source coupleable to the resistive element and configured to apply a test signal to the resistive element, wherein the test signal heats the resistive element and generates a response signal that relates to a resistance of the resistive element;

a processing system configured to measure a change in the response signal between two points of the response signal that are temporally spaced apart, and to establish a difference between the change in the response signal and a corresponding reference.

2. The diagnostic circuitry of claim 1, wherein the resistive element is selected from the group consisting of a resistance temperature detector, a thermocouple, a strain gauge, and a coil.

3. The diagnostic circuitry of claim 1, further comprising a memory connected to the processing system configured to store the reference.

4. The diagnostic circuitry of claim 1, wherein the process device is wholly loop powered.

5. The diagnostic circuitry of claim 1, wherein the process device is powered by a 4–20 mA loop.

6. The diagnostic circuitry of claim 1, wherein the process device comprises a 2-wire device.

7. The diagnostic circuitry of claim 1, wherein the process device comprises a temperature transmitter.

8. The diagnostic circuitry of claim 1, wherein the diagnostic circuitry intrinsically safe.

9. The diagnostic circuitry of claim 1, wherein the test signal source is a current source, and wherein the diagnostic circuitry further comprises:

a switch coupled to the current source wherein actuation of the switch causes the test signal to be applied to the resistive element; and a voltage detector configured to detect the response signal generated by the resistive element in response to the test signal.

10. The diagnostic circuitry of claim 1, wherein the processing system is further configured to produce a diagnostic output as a function of the difference.

11. The diagnostic circuitry of claim 10, wherein the diagnostic output is indicative of a condition of the resistive element.

12. The diagnostic circuitry of claim 10, wherein the diagnostic output is indicative of a life expectancy of the resistive element.

13. The diagnostic circuitry of claim 10, wherein the diagnostic output is in accordance with a communication protocol selected from a group consisting of Highway Addressable Remote Transducer, Fieldbus, Profibus, and Ethernet protocols.

14. The diagnostic circuitry of claim 1, wherein the processing system comprises a neural network.

15. The diagnostic circuitry of claim 1, wherein:
the process device is a process variable transmitter configured to measure a value of a process variable using the resistive element and to produce a process variable output indicative of the value; and
the processing system is configured to adjust the process variable output as a function of the difference.

16. A method for detecting degradation of a resistive element of a process device, comprising:
applying a test signal to the resistive element to heat the resistive element and to generate a response signal that is related to a resistance of the resistive element;
measuring a change in the response signal between two points of the response signal that are temporally spaced apart; and
comparing the change in the response signal to a corresponding reference to establish a difference that is indicative of degradation of the resistive elements.

17. The method of claim 16, further comprising measuring an operating temperature of the resistive element.

18. The method of claim 17, wherein the corresponding reference relates to the operating temperature.

19. The method of claim 16, wherein the process device is a two-wire device.

20. The method of claim 16, wherein the reference is a change between two points along a reference response signal.

21. The method of claim 16, wherein each of the two points represents a voltage drop across the resistive element.

22. The method of claim 16, wherein one of the two points represents an initial voltage drop and the other of the two points represents a final voltage drop.

23. The method of claim 16, wherein the test signal is applied for a selected period of time.

24. The method of claim 16, further comprising measuring a first operating temperature defined as the operating temperature of the resistive element before applying the test signal, and measuring a second operating temperature defined as the operating temperature of the resistive element after the test signal is applied and comparing the first operating temperature second operating temperature.

25. The method of claim 16, further comprising producing a diagnostic output as a function of the difference.

26. The method of claim 25, wherein the diagnostic output is indicative of a condition of the resistive element.

27. The method of claim 25, wherein the diagnostic output is indicative of a life-expectancy of the resistive element.

28. An apparatus for detecting degradation of a resistive element of a process device, comprising:
means for applying a test signal to the resistive element to heat the resistive element and to generate a response signal that is related to a resistance of the resistive element;
means for measuring a change in the response signal between two points along the response signal; and
means for comparing the change in the response signal to a corresponding reference to establish a difference that is indicative of degradation of the resistive element.

29. The apparatus of claim 28, further comprising:
means for establishing a difference between the change in the response signal and the corresponding reference; and
means for correcting an output produced by the resistive element as a function of the difference.

30. A computer readable medium having stored instructions executable by a processor capable of diagnosing a resistive element of a process device, the instructions comprising:
instructions for reading a response signal generated by the resistive element in response to a test signal, wherein the response signal is related to a resistance of the resistive element;
instructions for reading a change between two points along the response signal;
instructions for reading a corresponding reference; and
instructions for comparing the change to the reference to establish a difference that is indicative of degradation of the resistive element.

* * * * *

UNITED STATES PATENT AND TRADEMARK OFFICE
CERTIFICATE OF CORRECTION

PATENT NO. : 6,754,601 B1
DATED : June 22, 2004
INVENTOR(S) : Eryurek et al.

It is certified that error appears in the above-identified patent and that said Letters Patent is hereby corrected as shown below:

<u>Title page,</u>
Item [56], References Cited, U.S. PATENT DOCUMENTS, insert:
-- Re.  29,383   9/1977   Gallatin et al.   137/14 --

<u>Column 10,</u>
Line 55, after "circuitry" insert -- is --

<u>Column 12,</u>
Line 7, after "temperature" insert -- to the --

Signed and Sealed this

Thirty-first Day of August, 2004

JON W. DUDAS
*Director of the United States Patent and Trademark Office*